United States Patent
Hoffmann

(10) Patent No.: US 10,436,379 B2
(45) Date of Patent: Oct. 8, 2019

(54) POSITIONING AND LOCKING MECHANISM FOR A ROTATABLE VESSEL

(71) Applicant: Aaron Engineered Process Equipment, Inc., Bensenville, IL (US)

(72) Inventor: Jeffrey R. Hoffmann, Schaumburg, IL (US)

(73) Assignee: AARON ENGINEERED PROCESS EQUIPMENT, INC., Bensenville, IL (US)

( * ) Notice: Subject to any disclaimer, the term of this patent is extended or adjusted under 35 U.S.C. 154(b) by 39 days.

(21) Appl. No.: 15/729,136

(22) Filed: Oct. 10, 2017

(65) Prior Publication Data

US 2019/0107243 A1 Apr. 11, 2019

(51) Int. Cl.
  *F16M 11/00* (2006.01)
  *F16M 11/10* (2006.01)

(52) U.S. Cl.
  CPC ....... *F16M 11/10* (2013.01); *F16M 2200/021* (2013.01)

(58) Field of Classification Search
  CPC .. F16M 11/10; F16M 2200/021; B02C 17/00; B02C 17/18; B02C 17/24; B02C 17/181
  See application file for complete search history.

(56) References Cited

U.S. PATENT DOCUMENTS

| 1,806,194 | A | * | 5/1931 | Ensslin | B24B 31/02 366/220 |
| 2,419,814 | A | * | 4/1947 | Boileau | A01J 15/16 366/228 |
| 4,852,748 | A | * | 8/1989 | Burgess | B23Q 1/52 211/70.6 |
| 5,619,834 | A | * | 4/1997 | Chen | E04F 13/0855 52/126.1 |
| 8,622,353 | B1 | * | 1/2014 | Chielens | F16C 13/04 248/130 |
| 2012/0187267 | A1 | * | 7/2012 | Hudson | H02S 20/23 248/292.14 |
| 2013/0187013 | A1 | * | 7/2013 | Minami | B64D 37/005 248/70 |

* cited by examiner

*Primary Examiner* — Christopher Garft
(74) *Attorney, Agent, or Firm* — Barnes & Thornburg LLP; G. Peter Nichols

(57) ABSTRACT

A system for positioning a rotatable vessel includes a rotatable vessel having a target block fixed thereto. A protrusion that is configured to mate with the target block is coupled to a slide plate and moveable relative to the slide plate toward the target block. The slide plate is slidably adjustable relative to a fixed base plate. The precise rotational position of the vessel can be controlled by fixing the slide plate relative to the base plate, such that when the slide plate is locked to the base plate, extension of the protrusion into engagement with the target block will rotationally position the vessel. When the protrusion and the target block are engaged, the vessel and the slide plate are linked, and the position of the slide plate may be adjusted relative to the base plate to set an adjusted desired position of the vessel.

15 Claims, 4 Drawing Sheets

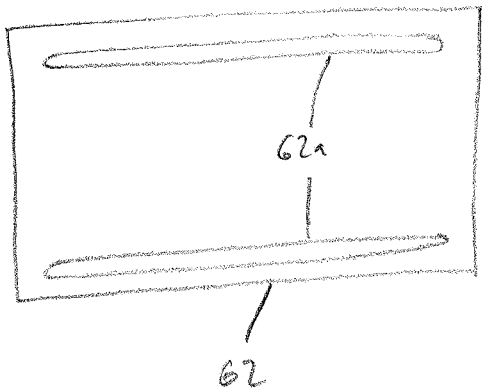
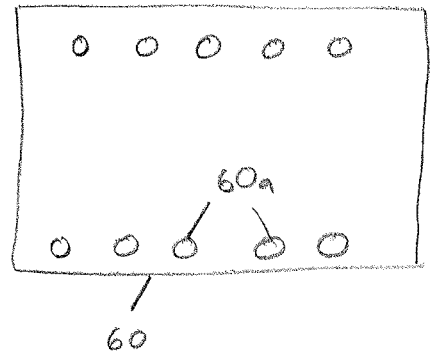
Fig. 6
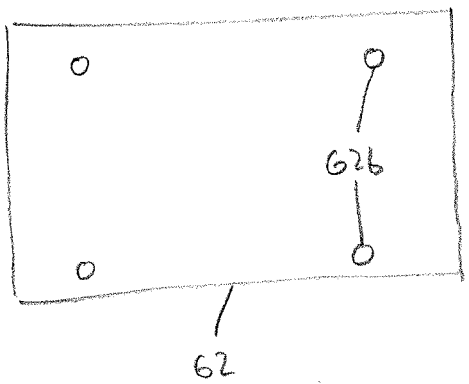
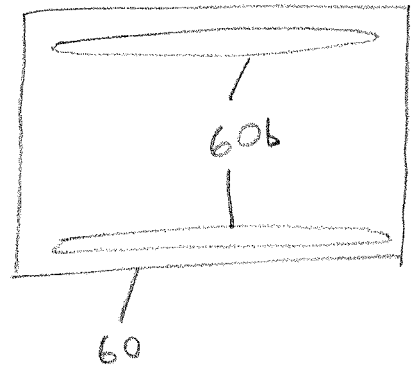
Fig. 7

POSITIONING AND LOCKING MECHANISM FOR A ROTATABLE VESSEL

BACKGROUND

1. Technical Field

The present disclosure relates to positioning systems for rotatable vessels. More particularly, the disclosure relates to a positioning and locking mechanism for rotary vessels.

2. Background Information

Rotatable vessels are used in a variety of systems. Rotating vessels may be used in the chemical process industries and can include a rotatable cylinder or other shaped vessel that is supported on a rotatable shaft. These types of systems can include ball mills, blenders, dryers, filters, and reactors.

Some common shapes used for the rotatable vessel include a double cone shape, an offset cone shape, a V-shaped vessel, a vertical cylinder, and a horizontal cylinder. For each of these shapes, the vessel may be mounted on a shaft that defines the axis of rotation. The shaft is rotated by a drive mechanism, and rotation of the shaft will cause the vessel to rotate to perform the intended operation.

These vessels may be loaded and discharged with solids, liquids, or a combination of a solid or liquid. Loading and discharge may occur through various ports, hatches, valves, or other opening located on the periphery of the vessel. In addition to loading and discharging, additional operations may be performed via these openings, such as product sampling, inspection, and cleaning.

To perform these operations, the vessel may be positioned at a predetermined location that corresponds to the desired operation. For example, for loading the opening may be positioned to be at the top of the vessel. The positioning occurs via rotation of the vessel to the desired rotational position. For discharge, the opening may be positioned at the bottom of the vessel.

To perform these operations, such as loading, discharging, or the like, an auxiliary flange may be connected to the opening. The flange may be stationary or retractable, and can make the connection from above or below, depending on the operation. Thus, the opening may dock with the flange to perform the desired operation. For example, the opening may dock with the flange of a supply of product that is to be loaded into the vessel, or the opening may dock with the flange of a discharge hopper or conduit for receiving product out of the vessel.

Positioning of the vessel can be automated through the use of a variable frequency drive, which can slow the vessel down, and through the use of a brake, which can stop and hold the vessel in the desired position. However, when loaded with product, the vessels may have considerable weight, in some cases exceeding 50,000 pounds. When loaded with product, the process of slowing, positioning, and stopping the vessel can be difficult to automate to a desired position with precision.

To determine the position of the vessel, a positioning disc with magnetic properties or other sensors may be used. Alternatively, an encoder or counter may be mounted on the motor. A programmable logic controller or other electronic or pneumatic logic can be used to sense the position of the vessel, slow the speed of the vessel, and lock the vessel in position with the brake. With this type of control, it is possible to position the vessel within a few degrees of a desired location.

However, even when the brake is in a locked position and holding the rotor of the drive motor in place, there can be backlash or play in the gearing. The type of gear reduction, the size of the vessel, and the rotational speed can affect the amount of backlash and play. Rotating a vessel at a slower speed can require more reduction and therefore more gears, and an increase in gears can increase the amount of backlash and play.

Thus, while the positioning system can be somewhat accurate in stopping the vessel near the desired and correct position, the backlash allows the vessel to move relative to the desired position, and the final position of the vessel and accuracy of the final position can be difficult to achieve.

In some cases, a generally correct positioning within a few degrees may be adequate. However, many rotatable vessel processes require inert atmospheres, or may involve highly toxic or biologically active chemicals. In such instances, a tight and reliable seal with the docking flange may be required. In the case of toxic and biologically active chemicals, the need for a human operator to make or break the connection between the vessel and the docking flange could be too hazardous. In the case of automated docking via a robotic arm, automated extension flanges, or other mechanisms, the final position of the vessel may need to be more accurate.

Accordingly, improvements can be made in the positioning of rotatable vessels.

SUMMARY

A system for positioning a rotatable vessel includes a rotatable vessel having a first end wall and a second end wall, and an axis of rotation extending through the end walls. A target block is fixed to the vessel at a location radially outward from the axis of the rotation, wherein the target block defines a female recess extending radially inward from a radially outer edge of the target block to define a target shape.

The system further includes a base plate having a radiused upper surface, where the radiused upper surface defines a radius having a center corresponding to the axis of rotation of the vessel. A slide plate has a radiused lower surface contacting the radiused upper surface, where the radiused lower surface defines a radius having a center corresponding to the axis of rotation of the vessel.

A protrusion is attached to the slide plate, where the protrusion is reciprocally moveable in a linear direction away from the slide plate. The slide plate has a locked configuration relative to the base plate and a moveable configuration relative to the base plate. The slide plate is selectively lockable to the base plate and moveable relative to the base plate in a rotational direction around the axis of rotation.

The protrusion has a protrusion shape that corresponds to the recess shape, and the protrusion is moveable away from the slide plate toward the target block and into engagement with the female recess. The protrusion has a retracted position and an extended position, where the protrusion engages the target block in the extended position. In the extended position of the protrusion, the vessel is locked in place rotationally relative to the slide plate.

In one example, the protrusion may be moveable in a linear direction along a path that intersects the axis of rotation of the vessel. In the extended position of the protrusion, rotational movement of the vessel may correspond to rotational movement of the slide plate. When the slide plate is in a locked configuration relative to the base plate and the protrusion is in an extended position, the vessel may be locked against rotation.

In one example, the target block may be located at the periphery of the first end wall.

In one form, the slide plate has a first locked position relative to the base plate, and when the protrusion is in the extended position the vessel has a first locked position relative to the slide plate, and the vessel is rotatable away from the first locked position when the protrusion is in the retracted position. The vessel may be rotatable relative to the slide plate when the protrusion is retracted, and the vessel may have a first free position when the protrusion is retracted. In one approach, in the first free position, a radially outer opening of the female recess intersects a travel path of the protrusion such that the protrusion will be received within the radially outer opening when extended. The first free position may be rotationally different than the first fixed position.

In one approach, linear movement of the protrusion along the travel path and into engagement with the target block rotates the vessel to the first fixed position. The slide plate may have a second locked position that is rotationally different than the first locked position and the vessel has a corresponding second locked position when the protrusion is in the extended position, and the vessel is rotationally moveable when the protrusion is in the retracted position, where extension of the protrusion into the target block will rotate the vessel to the second locked position of the vessel from the first free position when the slide plate is in the second locked position.

In one example, a positioning disc is attached to the first end wall or the second end wall of the vessel and at least one sensor is configured to detect a rotational position of the positioning disc.

In another example, a system for positioning a rotatable vessel includes a rotatable vessel having an axis of rotation and a target block fixed to the vessel, where the target block defines a target shape. A base plate has a fixed position relative to the vessel and has a radiused upper surface. A slide plate has a radiused lower surface corresponding to and contacting the radiused upper surface, where the slide plate is continuously rotationally adjustable relative to the base plate and lockable relative to the base plate at a plurality of rotational positions that are not predefined.

A protrusion is attached to the slide plate, where the protrusion is reciprocally moveable in a linear direction away from the slide plate and toward the axis of rotation of the vessel. The protrusion has a shape that corresponds to the target shape such that the target block and the protrusion fit together in a locked state, and the protrusion is moveable into and out of engagement with the target block.

When the slide plate is in a locked position relative to the base plate, and the protrusion is extended into engagement with the target block and in the locked state with the target block, the vessel is in a first locked position. When the protrusion is retracted out of engagement with the target block, the vessel is free to rotate relative to the slide plate. Movement of the protrusion into engagement with the target block when the slide plate is in the locked position will rotate the vessel to the first locked position from a different rotational position.

In one form, when the protrusion is in the locked state with the target block and the slide plate is moveable relative to the base plate, the vessel and slide plate rotate together. In another form, movement of the slide plate from the locked position to a different rotational position will rotate the vessel away from the first locked position to a different locked position.

In another embodiment, a method for positioning a rotatable vessel includes the step of rotating a vessel around an axis of rotation, where the vessel includes a target block fixedly attached thereto. The method further includes rotating the vessel to a first position, where the vessel is free to rotate away from the first position. The method also includes, in response to rotating the vessel to the first position, extending a protrusion into a mating engagement with the target block and locking the protrusion and target block together, where the protrusion is rotationally fixed to a slide plate and moveable linearly away from the slide plate, where the slide plate is rotationally adjustable and lockable between non-predefined rotational positions relative to a fixed base plate.

The method also includes, in response to extending the protrusion into the mating engagement with the target block, rotating the vessel from the first position to a second position. The vessel is locked in the second position when the protrusion and the target block are locked together and the slide plate is locked to the base plate.

In one form, the method further includes, prior to rotating the vessel to the first position, unlocking the slide plate from the base plate and rotating the vessel to a preliminary position, and extending the protrusion into engagement with the target block, wherein the slide plate and vessel and free to rotate relative to the base plate. In another form, the method further includes, prior to rotating the vessel to the first position, rotating the slide plate and vessel together when the protrusion and target block are locked, wherein the vessel is rotated to the second position.

In another form, the method may include, prior to rotating the vessel to the first position and after rotating the slide plate and vessel together to the second position, locking the slide plate to the base plate when the vessel is in the second position.

In one approach, the step of rotating the vessel to the first position includes rotating the vessel at a first speed, decreasing the rotational speed to a second speed, detecting a rotational position of the vessel using sensors and in response thereto further decreasing the rotational speed to a third speed and applying a brake to the vessel when it reaches the first position, and releasing the brake prior to extending the protrusion.

BRIEF DESCRIPTION OF THE DRAWINGS

FIG. 2A is a cross-sectional top view illustrating the protrusion slidably coupled to a rail that is attached to the slide plate;

FIG. 6 is a top view of the base plate and the slide illustrating slots in the base plate and holes in the side plate; and FIG. 7 is a top view of the base plate and the slide plate illustrating slots in the side plate and holes in the base plate.

DETAILED DESCRIPTION

Figure 1:
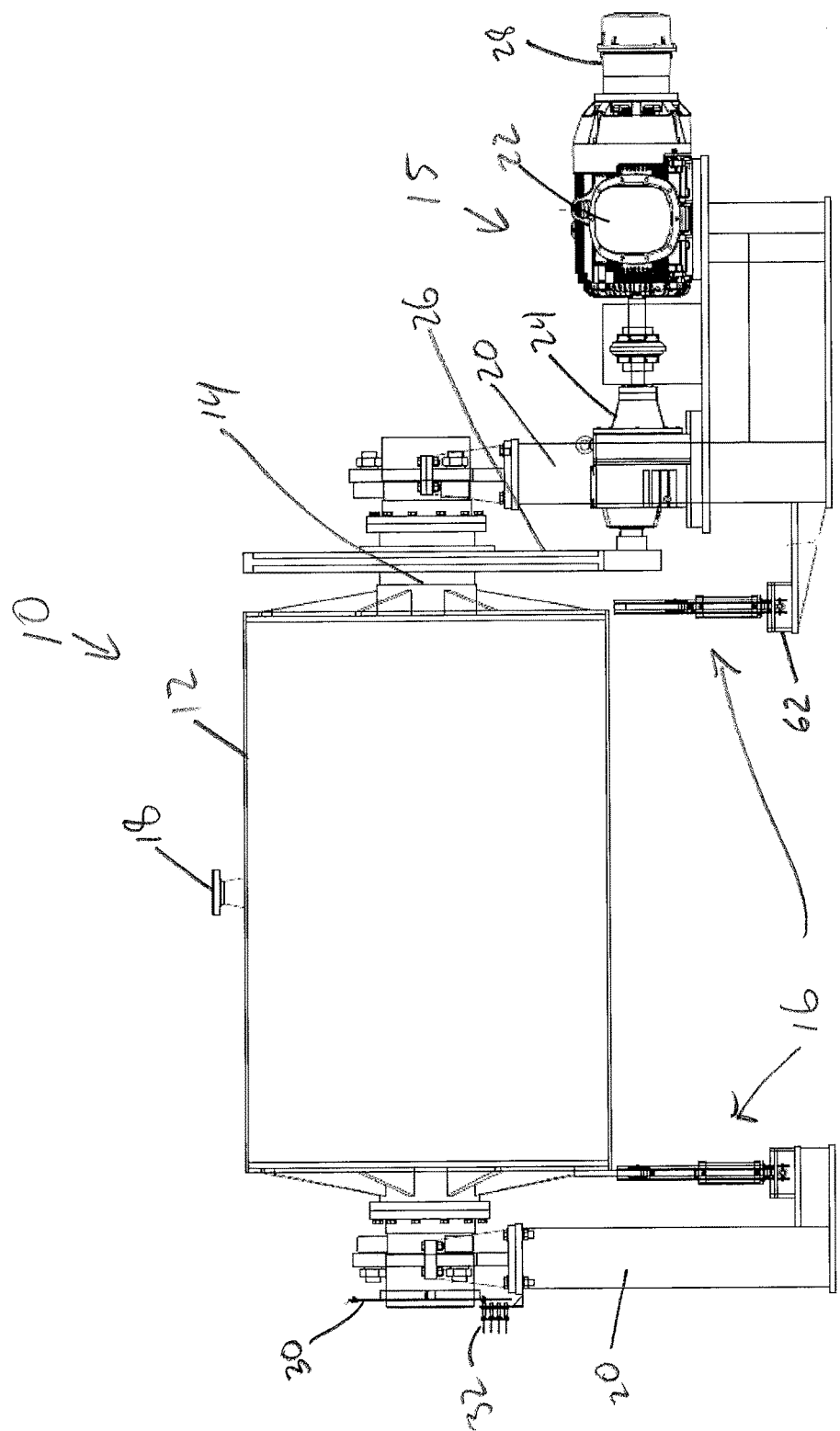
FIG. 1 is a front view of rotatable vessel and a positioning system.

With reference to the figures, and as shown in FIG. 1, a rotating vessel system 10 includes a rotatable vessel 12, a shaft 14 attached to the vessel 12, and a drive system 15. The system 10 further includes a positioning system 16 for accurately positioning the vessel in a desired location.

The vessel 12 is shown in the figures as being in the form of a horizontal cylinder. It will be appreciated that the vessel 12 may have other shapes. For example, the vessel 12 may be in the form of a double cone, offset cone, V-shape, or vertical cylinder as well. For the purposes of discussion, the vessel 12 will be described as a cylinder, and may be referred to as the cylinder 12 or vessel 12.

The vessel 12 may include an access port 18. The access port 18 may be located on the sidewall of the vessel 12. As shown in FIG. 1, the access port 18 is positioned at the top of the vessel 12 and extending radially outward from the sidewall of the vessel 12. The access port 18 will provide access into the interior of the vessel 12, to allow for loading or discharge of the product that is processed within the vessel 12.

The access port 18 is shown as having a tubular shape, however, the port 18 could also be in the form of a box, a grate, a hole, or other shape allowing for access into and out of the interior of the vessel 12. The access port 18 may be in the form of a valve, or other selectively open and closed opening. It will be appreciated that the size and shape of the port 18 can be other known sizes and shapes.

As the vessel 12 is rotated via the drive system 15, the position of the access port 18 will change. The position of the access port 18 on the periphery of the vessel 12 means that a small degree of angular rotation can lead to a large linear translation. The greater the diameter of the vessel 12, the greater the translation of the port 18 will change with a given angular movement.

The shaft 14 is coupled to the drive system 15 and is rotated in response to actuation of the drive system 15. The rotation of the shaft 14 rotates the vessel 12. The shaft 14 may be supported by a pair of trunnions 20 at each end of the shaft 14. The trunnions 20 provide a bearing surface for the shaft 14, as known in the art. The trunnions 20 provide a fixed base for the system 10, and additional structure may be attached to the trunnions 20 for support. The trunnions 20 may be fixed to the floor of a workspace.

The drive system 15 is used to rotate the shaft 14 and the vessel 12 to perform the desired rotational process. As the drive system 15 may be used to rotate the vessel 12, the drive system 15 may also act as a mechanism for positioning the vessel 12 in a desired location. Positioning the vessel 12 via the drive system 15 typically occurs at the conclusion of a rotating process, where the rotational speed of the vessel 12 may be slowed and made to come to a stop at a desired position.

The drive system 15 includes a motor 22 having a rotor (not shown). The motor 22 is coupled to a gear reducer 24, which may be coupled to a ring and pinion gear 26, which may be coupled to the shaft 14. Actuation of the motor 22 will ultimately cause the ring and pinion gear 26 to rotate the shaft 14 in a manner known in the art. The gear reducer 24 may be used to perform the primary reduction, and the ring and pinion gear 26 may be used to perform secondary reduction.

The drive system 15 may further include a brake 28, which may be coupled to the rotor of the motor 22. The brake 28 may be used to lock the motor 22, thereby fixing the drive system 15 in its position at the time of braking, subject to movement that may occur due to backlash or play in the gears of the drive system 15.

The drive system described above may be positioned to one longitudinal side of the vessel 12 and mounted to the trunnion 20 at that side.

The system 10 may further include a positioning disc 30 including magnets mounted thereto. The system 10 may further include one or more sensors 32 mounted adjacent to the positioning disc 30. The positioning disc 30 may be mounted to the shaft 14, such that it rotates along with the shaft 14 and the vessel 12. The sensors 32 may be mounted at a fixed location to one of the trunnions 20. As the disc 30 rotates, the sensor 32 will track the rotation and corresponding position.

As shown in FIG. 1, the sensors 32 and positioning disc 30 are located on the side of the vessel 12 that is opposite the side where the drive system 15 is located. In another approach, the sensors 32 and positioning disc 30 may be located on the same side of the vessel 12 as the drive system 15. The combination of the sensors 32 and the positioning disc 30 may also be referred to as a position monitor or position tracker.

As described above, the system 10 further includes the positioning systems 16. As shown in FIG. 1, the system 10 includes two positioning systems 16, but the system 10 could include only one, or could include more than two. The positioning system 16 may include multiple components that act together to position the vessel 12 in the desired location, as further described below.

Figure 2:
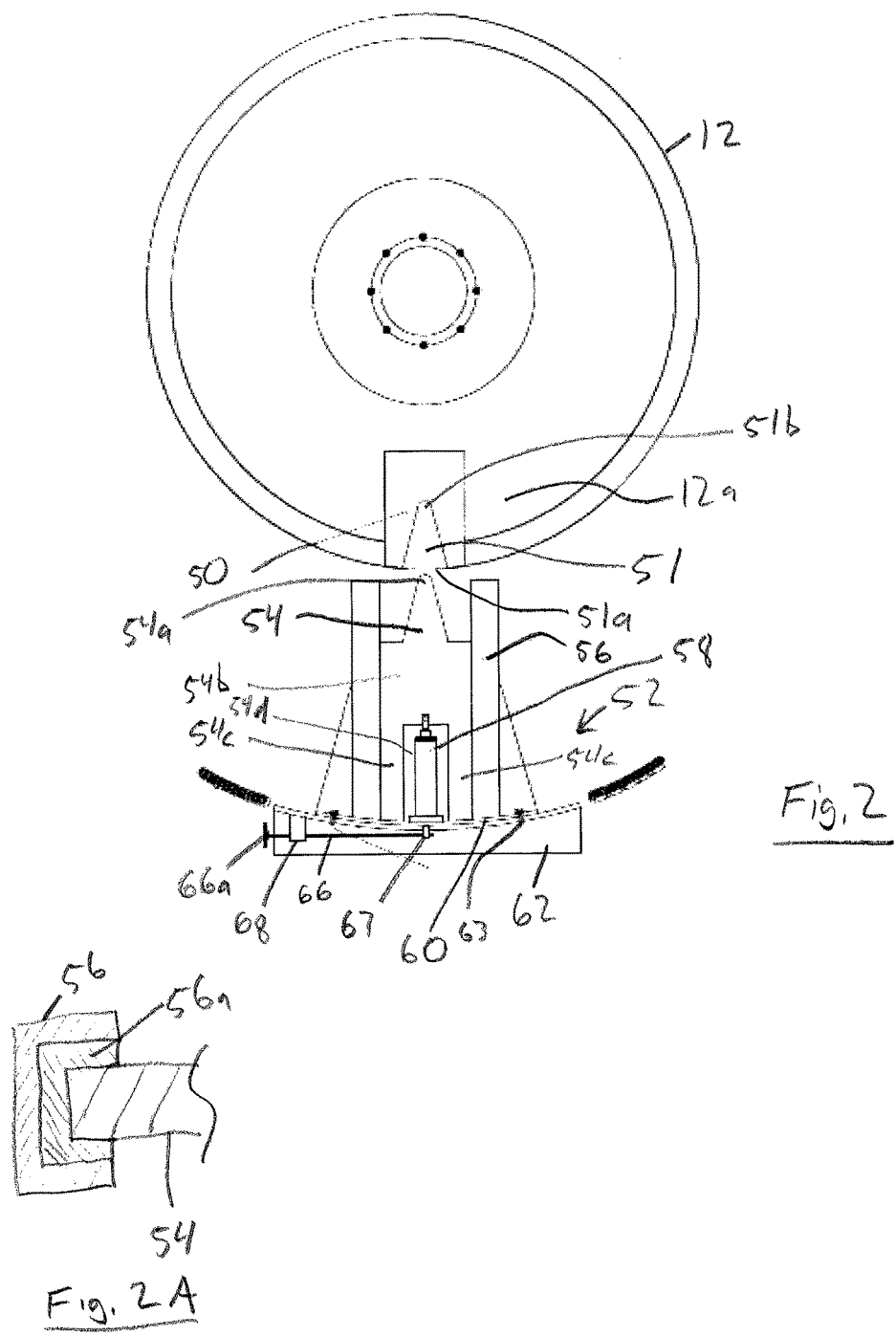
FIG. 2 is a side view of the system, illustrating a target block fixed to the vessel, a moveable protrusion coupled to a slide plate, and a base plate coupled to the slide plate, showing the protrusion in a retracted position.

With reference to FIG. 2, the positioning system 16 preferably includes a target block 50 mounted to an end surface 12a of the vessel 12. The target block 50 may have a variety of different outer profiles depending on the type of vessel 12 that is used. As shown in FIG. 2, the target block 50 has a generally rectangular outer profile. The target block 50 is preferably made of a hard and rigid and substantially inflexible material.

In one approach, the target block 50 is positioned at the periphery of the end surface 12a. Locating the target block 50 near the periphery increases the accuracy of the position of the periphery of the vessel 12. As described above, the port 18 is located on the periphery of the vessel 12, so increasing the positioning accuracy at this distance from the center of the vessel 12 is desirable.

While the target block 50 is located at the periphery of the end surface 12a, it extends radially toward the center of the vessel 12 along the end surface 12a. In one form, the target block 50 does not extend radially beyond the outer radial edge of the vessel 12. However, in another approach, the target block 50 may extend beyond the outer radial edge of the vessel 12.

The target block 50 is rigidly and fixedly attached to the vessel 12. Thus, positioning the target block 50 in a desired location or position will fix the vessel 12 in the desired location or position. By fixing the position of the target block 50 relative to the vessel 12, the drive system 15 does not have to be used to position and hold the vessel 12 in place if the target block 50 is held in place.

The target block 50 is configured to receive corresponding structure that will hold the target block 50 in place, thereby holding the vessel 12 in place in accordance with the fixed relationship between the vessel 12 and the target block 50. The target block 50 therefore includes a female recess 51 that is sized and configured to receive a corresponding structure for locking the target block 50 in place. The recess 51 may be in the form of a tapered recess or a V-shape or U-shape. In another approach, the recess may have a square or rectangular shape. The recess 51 includes a base opening 51a through which corresponding structure can be inserted. The recess 51 may be enclosed on all sides, such that the opening 51a is the only opening into the recess 51, or the recess 51 may be open on its side in the direction away from the end of the vessel 12.

The recess 51 may be in the form of a slot, such that the opening 51 is wider in the direction extending along the end of the vessel 12 that it is in the direction corresponding to the longitudinal axis of the vessel 12, such that the opening is in the shape of a rectangle. In another approach, the recess 51 may be as wide as it is long, such that the opening 51a is in the shape of a square. The recess 51 may also have an opening in the shape of an oval or a circle.

The recess 51 preferably tapers down from its opening 51 in a direction toward the axis of the rotation of the vessel 12, such that the recess 51 will approach an apex 51b opposite the opening 51a. Thus, the recess 51 may have a wedge-shape. In another approach, the recess 51 may have a pyramid shape, or a conical shape. It will be appreciated that other shapes of the recess 51 may also be used.

The positioning system 16 further includes a base portion 52. The base portion 52 is mounted to one of the trunnions 20. The base portion 52 thereby remains in a fixed position when the vessel 12 rotates, with the target block 50 rotating along with the vessel 12. The base portion 52 is used to fix the position of the target block 50, and thereby fix the position of the vessel 12.

The base portion 52 includes a moveable male protrusion 54 that is sized and configured to extend into and mate with the recess 51. The protrusion 54 is moveable in a direction toward the axis of rotation of the vessel 12, and is generally restricted from movement in any lateral or longitudinal direction relative to the base 52 and the vessel 12, whether in the extended or retracted position. Thus, when the recess 51 has received the protrusion 54 after the protrusion has been extended and inserted into the recess, the target block 50 will be restricted from rotational movement relative to the position of the protrusion 54.

The base 52 further includes a pair of guide rails 56 that are coupled to and support that the protrusion 54, allowing the protrusion 54 to extend and retract in the direction toward and away from the axis of rotation of the vessel 12. The guide rails 56 may include bearings or the like that guide the protrusion 54 in the desired direction. In one form, as shown in FIG. 2A, the guide rail 56 includes an inner bearing 56a that receives the protrusion 54 and allows the protrusion to slide along the surfaces of the bearing 56a. In another approach, the guide rail 54 may act as the bearing surface. The bearing 56a may be made of Rulon or UHMW.

The protrusion 54 may include an upper point 54a and a lower body portion 54b. The body portion 54b is preferably held by the guide rails 56, with the point 54a extending upward from the body portion 54b. Thus, the point 54a protrudes from the body portion 54b, and is the portion that is received in the recess 51.

The body portion may include a pair of legs 54c on opposite sides of the body portion 54b, where the legs 54c are guided within the guide rails 56 along with the rest of the body portion 54b. The body portion 54b may also define an opening 54d defined between the legs 54c and the upper portion of the body portion 54d.

The protrusion 54 may be coupled to an actuator 58, such as a pneumatic or hydraulic actuator, or a magnetic actuator, or other types of driving members configured to actuate the protrusion 54 upward and into engagement with the target block 50 and downward and out of engagement with the target block 50.

The actuator 56 is preferably in the form of a linear actuator, although other actuators could also be used, such as rotary actuators, rotation-translation conversion actuators, or the like.

Figure 3:
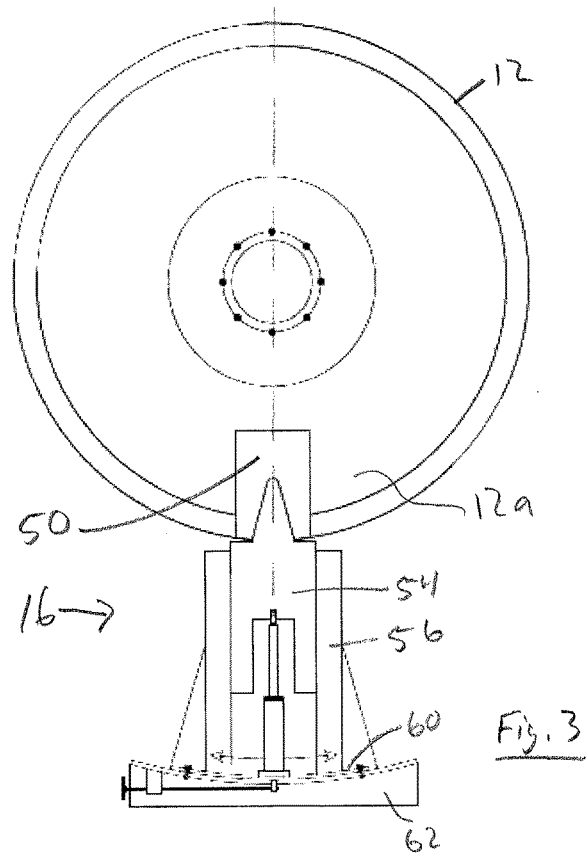
FIG. 3 is a side view, showing the protrusion in an extended position and engaged with the target block.

The protrusion 54 being actuated and extended into engagement with the target block 50 is shown in FIG. 3.

Figure 4:
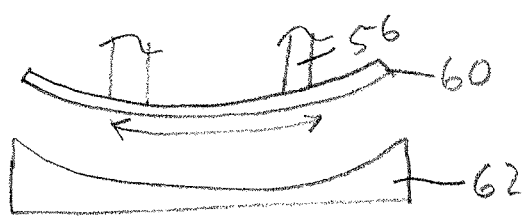
FIG. 4 is a side view that illustrates the slide plate and the base plate, each having corresponding radiused surfaces.

As shown in FIGS. 2-4, the base 52 further includes a moveable slide plate 60 and a fixed base plate 62. The fixed base plate 62 is preferably fixedly mounted to the trunnion 20 (as shown in FIG. 1). The slide plate 60 is moveable relative to the base plate 62, and can be selectively fixed at different positions relative to the base plate 62.

The slide plate 60 has a curved shape, with the center of curvature being the same as the axis of the rotation of the vessel 12.

The rails 56 and the actuator 58 are each attached to the slide plate 60, which is mounted to the base plate 62. The protrusion 54 is attached to the base plate via its attachment to the rails 56 and actuator 58. Thus, as the slide plate 60 moves relative to the base plate 62, the protrusion 54, the rails 56, and the actuator 58 move along with the slide plate 60.

While the slide plate 60 is moveable relative to the base plate 62, the slide plate 60 is also fixable to the base plate 62, such that the slide plate 60 can be fixedly positioned in a number of different positions after being adjusted relative to the base plate 62. The number of positions of the slide plate 60 relative to the base plate 62 is effectively unlimited, as the slide plate 60 is slidable relative to the base plate 62 in a continuous manner.

As described above, the slide plate 60 has a curved shape having a radius that is centered on the axis of rotation of the vessel 12. Similarly, the base plate 62 has upward facing surface having a radius that is also centered on the axis of rotation of the vessel 12. The radius of the upper surface of the base plate 62 is essentially the same as the radius of a bottom surface of the slide plate 60, such that the slide plate 60 can smoothly slide along the surface of the base plate 62.

The slide plate 60 is configured to be adjustable along an arcuate path corresponding to the curvature of the slide plate 60 and the base plate 62. The arcuate path allows for adjustment in two opposing angular directions, but is preferably restricted from lateral movement in a direction along the longitudinal axis of the vessel 12. Put another way, the slide plate 60 is preferably adjustable in a direction that is perpendicular to the longitudinal axis of the vessel 12 or in a circumferential direction about the axis of rotation of the vessel 12.

Figure 5:
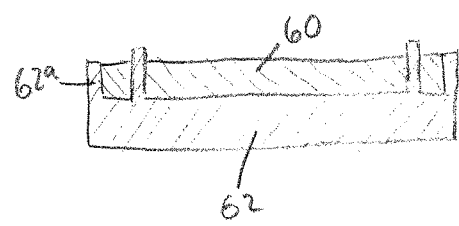
FIG. 5 is a cross-sectional front view of the slide plate and the base plate.

As shown in FIG. 5, to maintain the slide plate 60 in a fixed longitudinal position, the base plate 62 may include side rails 62a on opposing sides of the slide plate 60. Additionally, or alternatively, the base plate 62 and/or slide plate 60 may include pegs or other protrusions extending from the surface and into a corresponding slot in the other of the base plate 62 or slide plate 60.

The slide plate 60 is fixable to the base plate 62 via additional mechanical mounting structure. In one approach, the slide plate 60 may be fixed to the base plate 62 via bolts 63, as shown in FIGS. 2 and 3. In another approach, the slide plate 60 may be fixable to the base plate via clamps. Other approaches to mechanically fixing the slide plate 60 relative to the base plate 62 known in the art could also be used.

As shown in FIG. 6, in the case of bolts 63, the slide plate 60 may include a plurality of holes 60a extending through the slide plate 60, through which the bolts 63 can pass and engage with the base plate 62. In this approach, the base plate 62 may include a slot 62a having a width comparable to the size of the bolts. The slot 62a in the base plate 62 extends in a direction corresponding to the direction of adjustment, such that the holes 60a in the slide plate 60 that carry the bolts 63 will translate along the slot in the base plate 62. Thus, the slide plate 60 may be adjusted to the desirable angular position and bolted in place relative to the base plate 62 at any desired angular position.

In another approach, as shown in FIG. 7, the base plate 62 may include through holes 62b through which bolts may extend. In this approach, the slide plate 60 includes a slot or slots 60b, and the slots 60b will translate along with the slide plate 60 relative to the base plate 62 having the holes 62b and bolts 63. Similar to the above, the slide plate 60 may be fixed once it is in the desired position by securing the bolts 63.

In another approach, both the slide plate 60 and the base plate 62 may include slots 60b and 62a, respectively, such that the slots 60b in the slide plate 60 will move relative to the slots 62a in the base plate 62. Once in a desired position, bolts 63 may be secured through the slots in both the slide plate 60 and the base plate 62 to fix the slide plate 60 and base plate 62 together.

Regardless of which component includes the slots and/or holes, the slots/holes in the slide plate 60 and base plate 62 that are used for securing the slide plate 60 to the base plate 62 will overlie each other when viewed from above, such that translation of the slide plate 60 relative to the base plate 62 will result in an opening through which the bolts 63 can pass to secure the slide plate 60 to the base plate 62.

In another approach, clamps may be used that clamp the slide plate 60 to the base plate 62. In this approach, the slide plate 60 and the base plate 62 may be free from corresponding slots or holes. The clamps may be fixed to either the slide plate 60 or the base plate 62. When the clamp is fixed to the slide plate 60, the clamp will move along with the slide plate 60. When the clamp is fixed to the base plate 62, the slide plate 60 will move relative to the clamp. The slide plate 60 and the base plate 62 may each include a fixed clamp, such that the slide plate 60 will move relative to the clamp fixed to the base plate, and the clamp fixed to the slide plate 60 will move relative to the base plate 62.

Movement of the slide plate 60 can be accomplished manually or through electromechanical assistance.

In one approach, an elongate adjustment screw 66 may be used to adjust the position of the slide plate 60 relative to the base. The screw 66 may have a handle 66a at an outer end and may be coupled to the rotational bearing 67 at an inner end. The bearing 67 may be fixed to the slide plate 60. The base plate 62 may include a corresponding threaded nut member 68 through which the screw 66 can be adjusted.

The screw 66 may be rotated relative to the nut 68, thereby causing the screw 66 to move relative to the base plate 62. Movement of the screw 66 will cause a corresponding pushing or pulling movement on the slide plate 60, thereby adjusting the position of the slide plate 60.

In another approach, the slide plate 60 (or other structure fixed to the slide plate 60, such as the rails) may include a handle or other graspable structure that can aid in moving the slide plate 60 relative to the base plate 62.

Thus, as described above, the slide plate 60 may be adjusted and fixed relative to the base plate 62 to allow for precise angular adjustment of the slide plate 60.

The protrusion 54 coupled to the slide plate 60 via the rails 56 can therefore likewise be adjusted to different and precise angular positions relative to the base plate 62. The base plate 62 may be fixed to the trunions 20 or other "ground" type structure. The trunnions 20, which support the vessel 12, are also in a fixed or "ground" position. Accordingly, the precision afforded by the adjustment of the slide plate 60 relative to the base plate 62 and "ground" allows for precisely positioning the protrusion 54 relative to the vessel 12. By engaging the protrusion 54 with the vessel 12, the vessel 12 can thereby be precisely positioned due to the positioning of the protrusion 54.

As described above, the protrusion 54 is adjustable in a direction both toward and away from the axis of rotation of the vessel 12. The protrusion 54 will travel along a path in which the center of the protrusion 54 remains directed to the center of the axis of rotation of the vessel 12. This path of travel for the protrusion 54 remains directed at the axis of the rotation of the vessel 12 regardless of the position of the slide plate 60 relative to the base plate 62. This is due to the slide plate having a radius that is centered on the axis of the rotation of the vessel 12. Thus, when the slide plate 60 is moved relative to the base plate 62, the protrusion 54 and is path of travel remains directed to the axis of rotation of the vessel 12.

The protrusion 54 is moveable along its path of travel between a retracted position (FIG. 2) and an extended position (FIG. 3). In the retracted position, the protrusion 54 is retracted relative to the vessel 12 and is positioned toward the bottom of the slide plate 60 and the base plate 62. In the extended position, the protrusion 54 is extended away from the slide plate 60 and the base plate 62 and toward the center of the vessel 12.

When the target block 50, which is positioned at the outer radial edge of the vessel 12, is rotationally aligned and positioned within the path of the protrusion 54, the protrusion 54 will engage with the target block 50. If the center of the target block 50 is precisely aligned on the center of the protrusion 54 along the path of travel of the protrusion 54, the extension of the protrusion 54 will cause the protrusion 54 to mate with the target block 50 without resulting in any movement of the target block 50.

However, the target block 50 being perfectly aligned and centered on the path of travel of the protrusion 54 is typically unlikely to occur, due to the inability to precisely control the stopping point of the rotatable vessel 12 via its normal rotation and positioning mechanism. Thus, in use, the target block 50 will not be perfectly aligned with the centerline of the path of travel of the protrusion 54.

When the target block 50 is off center from the center of the protrusion 54 along its path of travel, extension of the protrusion 54 will result in the terminal end or point of the protrusion 54 contacting an off center surface within the target block 50. Continued extension of the protrusion 54 into the target block 50 will cause the end of the protrusion 54 to slide along the inner surface of the target block 50.

If the vessel 12 is in a locked position (via the motor, brake, or other means) and the protrusion 54 and slide plate 60 are in an unlocked position, the result of continued extension of the protrusion 54 would cause the protrusion 54 to become centered within the fixed target block 50, and the slide plate 60 would slide along the base plate 62 until the protrusion 54 bottoms out in the target block 50. Accordingly, this approach could be used as a method of positioning the slide plate 60 relative to the base plate 62, where the slide plate 60 could thereafter be fixed to the base plate 62 as described above and with the protrusion 54 fully extended and engaged with the target block 50.

However, if the vessel 12 is in an unlocked position and the slide plate 60 and protrusion 54 are in a rotationally locked position relative to the base plate 62, continued extension of the protrusion 54 will cause the target block 50 and the vessel 12 to rotate until the protrusion 54 bottoms out in the target block 50 and is fully engaged with the target block 50. Thus, by fixing the slide plate 60 and locking the path of travel for the protrusion 54, the target block 50 and vessel are adjusted to conform to the position set by the position of the slide plate 60.

Further, in one approach, both the vessel 12 and the slide plate 60 may be in an unlocked position at the same time, thereby making the target block 50 and the protrusion 54 also in an unlocked rotational position. In this configuration, extension of the protrusion 54 into engagement with the target block 50 can result in both the vessel 12 and the slide plate 60 rotating about the axis of rotation of the vessel 12. The degree of rotation for each of the components can depend on the inertia of each of the components, in addition to any frictional loading that may resist rotation. Typically, the component with the least amount of combined inertial and frictional resistance to movement will stay relatively fixed while the component with the lower resistance to movement will be the component that moves. In any case, once the protrusion has fully extended and bottomed out in the target block, the centers of the target block 50 and protrusion 54 will be aligned with the axis of rotation of the vessel 12.

In the case where both the vessel 12 and the slide plate 60 are in an unlocked position, the vessel 12 and slide plate 60 may be rotated together when the protrusion 54 and the target block 50 are engaged with each other. In this approach, the slide plate 60 may be moved, thereby rotating the vessel 12 along with it, or the vessel 12 may be rotated, thereby moving the slide plate 60 along with it. Similarly, both the vessel 12 and the slide plate 60 may be actuated for movement together.

Thus, in view of the above, the slide plate 60, protrusion 54, target block 50, and vessel 12 are related and dependent with each other for their respective position. Accordingly, fixing some of the components will result in the unfixed components to conform to the position of the components that are fixed in place. In that regard, the ability to precisely position the slide plate 60 (and the protrusion 54 coupled to the slide plate) will result in the ability to precisely position the vessel 12 with a greater degree of precision than the vessel 12 can achieve through its typical rotational and positioning means.

In view of the above, the vessel 12 need only be positioned roughly relative to the position of the slide plate 60 and the protrusion 54. The vessel 12 can ultimately be precisely located rotationally by being initially rotationally positioned such that the bottom opening of the target block 50 intersects with the center of the path of travel of the protrusion 54, such that extension of the protrusion 54 will result in the protrusion entering the target block 50.

Furthermore, by locking the slide plate 60 to the base plate 62, the vessel 12 can be repeatedly positioned in the same precise location as long as the slide plate 60 remains in the same fixed position.

Thus, the above described system allows for precision in locating the vessel 12 in an efficient and repeatable process to a degree not achievable by the standard rotational positioning of the vessel 12.

Having described the components and structure of the system, and their capabilities, a method for using the system and the corresponding components will now be described in further detail.

The system may be operated in a traditional manner, where the vessel 12 is rotated about its axis of rotation to process the contents within the vessel 12. The vessel 12 may be slowed during its rotation to a fraction of its full speed by a known speed controlling device. As the vessel 12 is rotating at a reduced speed, the positioning disc 30 will similarly rotate at a reduced speed relative to the sensors 32.

When a specific point on the positioning disc 30 is detected to have passed the sensors 32, the vessel 12 may be slowed to an even slower rotational rate. Once a second point on the positioning disc passes the sensors 32, the driving mechanism of the vessel 12 may be disengaged, and the motor brake 28 of the system may be applied. As a result of the slowed rotation and selected braking, the target block 50 may be positioned generally above the protrusion 54, as shown in FIG. 2.

With the vessel 12 in a locked position due to the brake 28 or other locking mechanism, the protrusion 54 is extended by actuating the actuator 58. The protrusion 54 will translate linearly away from the slide plate 60 and into engagement with the target block 50.

As the end of the protrusion 54 engages the target block 50, or clears the opening of the target block 50, the brake 28 or locking mechanism is disengaged, allowing the vessel 12 to rotate freely about its axis.

The protrusion 54 may then continue to be extended into the target block 50, and the target block 50 and vessel 12 will rotate in accordance with the continued extension of the protrusion 54 into the target block 50.

Once the protrusion 54 is fully seated in the target block 50, the position of the vessel 12 will be fixed and held rotationally in place. This position will be maintained throughout the time that the protrusion 54 remains extended into the fully seated position.

With the vessel 12 held in place by the extended protrusion 54, the vessel 12 is in a precise location corresponding to the locked position of the slide plate 60, and the opening of the vessel 12 through which the contents of the vessel 12 may be discharged can mate with a corresponding evacuation mechanism to retrieve the contents of the vessel 12.

The precise position of the vessel 12 allows for the evacuation mechanism to be automated to extend and mate to the same position repeatedly. This automatic and precise mating to a precisely positioned rotational vessel 12 allows for increased sealing abilities and increased assurance that the seal between the vessel 12 and the evacuation mechanism will be precisely seated, thereby reducing exposure of the contents to the environment and the resulting loss of product of possibility of contamination.

When it is desirable to rotate the vessel 12 again, the protrusion 54 may be retracted back toward the slide plate 60 and out of engagement with the target block 50. Prior to retracting the protrusion 54, the motor brake 28 may be applied again, to prevent the vessel 12 from rotation after being disengaged.

Once the protrusion 54 is fully retracted or otherwise clear of the target block 50 and the vessel 12, the motor brake 28 may be released, and the drive may be started again. The above procedure can be repeated multiple times, with the vessel 12 ultimately being precisely positioned according to the protrusion 54 in the same position repeatedly.

The above method corresponds to a configuration where the desired position of the vessel 12 has already been determined and set by the slide plate 60. However, the slide plate 60 is positioned initially to set the ultimate desired position. The slide plate 60 may also need to be readjusted for later procedures.

To set the position of the slide plate 60, the vessel 12 may be rotated to an approximate position that corresponds to the desired location for discharge. The vessel 12 may be rotated via the motor, and the positioning disc 30 may be used along with the sensors 32 to determine the general rotational position of the vessel 12. Similar to the above, the vessel 12 and its rotation may be slowed by the motor during its rotation to bring it to a stop via the motor brake 28.

With the vessel 12 in the desired approximate position, the motor brake 28 is released, allowing for the vessel 12 to be rotated and adjusted slightly.

The bolts 36 (or other structure) that hold the slide plate 60 to the base plate 62 are loosened, such that the slide plate 60 may be adjusted relative to the base plate 62. The adjustment screw 66 or other adjustment mechanism may be actuated manually.

With the slide plate 60 being adjustable relative to the base plate 62, the protrusion 54 may be actuated toward the target block 50. The protrusion 54 will engage the target block 50 as described above, with the protrusion 54 contacting the interior of the target block 50.

Extension of the protrusion 54 may cause the target block 50 to adjust rotationally relative to the protrusion 54. However, because the slide plate 60 is moveable relative to the base plate 62, it is also possible that the slide plate 60 and the protrusion 54 may rotationally adjust relative to the target block 50. It is also possible that both the target block 50 and the protrusion 54 will rotationally adjust during the engagement, with the vessel 12 and the slide plate 60 thereby adjusting as well.

Once the protrusion x54 is fully extended and engaged with the target block 50, the vessel 12 and slide plate 60 become locked in position relative to each other due to the engagement between the protrusion 54 and the target block 50. However, because the slide plate 60 is free to move relative to the base plate 62, the vessel 12 and slide plate 60 remain adjustable relative to the base plate 62.

Thus, with the vessel 12 and the slide plate 60 locked relative to each other, the vessel 12 and slide plate 60 are rotated together relative to the base plate 62. The vessel 12 may then be precisely rotated relative to the base plate 62, with the vessel 12 being rotationally positioned to the precise location desired for discharge of the contents of the vessel 12. The vessel 12 is rotatable to any specific rotational position to ensure a precise location.

Rotation of the vessel 12 may be accomplished by directly rotating the vessel 12, causing the slide plate 60 to rotate with it. In another approach, the slide plate 60 may be adjusted rotationally by the screw 66 or rod 70, thereby rotating the vessel 12 along with it. In a further approach, the vessel 12 may be directly rotated along with direct adjustment of the slide plate 60 to distribute the force required to achieve the rotation of the coupled vessel 12 and slide plate 60.

With the vessel 12 in the desired final rotational position, the bolts 63 between the slide plate 60 and the base plate 62 are then tightened. The slide plate 60 thereby becomes fixed in position relative to the base plate 62. Likewise, due to the engagement between the protrusion 54 and the target block 50, the vessel 12 is also locked to the base plate 62 at this stage.

The position of the vessel 12 may be checked again and confirmed to ensure that the position of the vessel 12 is in the desired location. If the vessel 12 needs to be readjusted, the bolts 63 may be loosened again and the slide plate 60 and vessel 12 can be jointly adjusted once again, and the bolts 63 can once again be tightened. This readjustment may occur multiple times if desired until the vessel 12 is in the precise desired location after locking the slide plate 60 to the base plate 62 via the bolts.

With the slide plate 60 locked to the base plate 62 in a position corresponding to the precise desired location of the vessel 12, the protrusion 54 may be retracted away from the target block 50. The motor brake 28 may be applied, if desired, to hold the vessel 12 in a position approximating the precise desired position, thereby keeping the vessel 12 in place to allow for further processing or loading.

The vessel 12 may then be rotated to perform the desired operation, and can later be stopped to allow for discharge of the contents as described above. Because the slide plate 60 is locked to the base plate 62, extension of the protrusion 54 into the target block 50 at a later stage will return the vessel 12 to the precise location previously set.

The adjustment of the slide plate 60 relative to the base plate 62 will typically not have to be performed again. Repeated engagement and disengagement of the protrusion 54 and the target block 50 will result in a repeatable precise position of the vessel 12. However, in the event that the precise desired final position of the vessel 12 needs to be changed or adjusted, such as due to a different discharge apparatus that is configured to mate with the vessel 12, the slide plate 60 and base plate 62 may be adjusted relative to each other again by loosening the bolts 36 and repeating the above described procedure for setting the desired final location.

Thus, the above described system and method provides for a highly repeatable and precise location for a rotatable vessel 12 that is not possible using traditional positioning means such as a motor and motor brake. This highly repeatable precise positioning allows for automating the positioning after the desired location is set, thereby not requiring manual adjustment to ensure a precise location for discharge after each process.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

What is claimed is:

1. A system for positioning a rotatable vessel, the system comprising:
   a rotatable vessel having a first end wall and a second end wall, and an axis of rotation extending through the end walls;
   a target block fixed to the vessel at a location radially outward from the axis of the rotation, wherein the target block defines a female recess extending radially inward from a radially outer edge of the target block to define a target shape;
   a base plate having a radiused upper surface, wherein the radiused upper surface defines a radius having a center corresponding to the axis of rotation of the vessel;

a slide plate having a radiused lower surface contacting the radiused upper surface, wherein the radiused lower surface defines a radius having a center corresponding to the axis of rotation of the vessel;

a protrusion attached to the slide plate, wherein the protrusion is reciprocally moveable in a linear direction away from the slide plate;

wherein the slide plate has a locked configuration relative to the base plate and a moveable configuration relative to the base plate, wherein the slide plate is selectively lockable to the base plate and moveable relative to the base plate in a rotational direction around the axis of rotation;

wherein the protrusion has a protrusion shape that corresponds to the female recess, and the protrusion is moveable away from the slide plate toward the target block and into engagement with the female recess;

wherein the protrusion has a retracted position and an extended position, where the protrusion engages the target block in the extended position;

wherein, in the extended position of the protrusion, the vessel is locked in place rotationally relative to the slide plate.

2. The system of claim 1, wherein the protrusion is moveable in a linear direction along a path that intersects the axis of rotation of the vessel.

3. The system of claim 1, wherein, in the extended position of the protrusion, rotational movement of the vessel corresponds to rotational movement of the slide plate.

4. The system of claim 1, wherein, when the slide plate is in a locked configuration relative to the base plate and the protrusion is in an extended position, the vessel is locked against rotation.

5. The system of claim 1, wherein the target block is located at a periphery of the first end wall.

6. The system of claim 1, wherein the slide plate has a first locked slide plate position relative to the base plate, and when the protrusion is in the extended position the vessel has a first locked vessel position relative to the slide plate, and the vessel is rotatable away from the first locked vessel position when the protrusion is in the retracted position.

7. The system of claim 6, wherein the vessel is rotatable relative to the slide plate when the protrusion is retracted, and the vessel has a first free vessel position when the protrusion is retracted.

8. The system of claim 7, wherein, in the first free vessel position, a radially outer opening of the female recess intersects a travel path of the protrusion such that the protrusion will be received within the radially outer opening when extended.

9. The system of claim 8, wherein the first free vessel position is rotationally different than the first locked vessel position.

10. The system of claim 9, wherein linear movement of the protrusion along the travel path and into engagement with the target block rotates the vessel to the first locked vessel position.

11. The system of claim 10, wherein the slide plate has a second locked slide plate position that is rotationally different than the first locked slide plate position and the vessel has a corresponding second locked vessel position when the protrusion is in the extended position, and the vessel is rotationally moveable when the protrusion is in the retracted position, wherein extension of the protrusion into the target block will rotate the vessel to the second locked vessel position of the vessel from the first free position when the slide plate is in the second locked slide plate position.

12. The system of claim 1, further comprising a positioning disc attached to one of the first end wall or the second end wall of the vessel and at least one sensor configured to detect a rotational position of the positioning disc.

13. A system for positioning a rotatable vessel, the system comprising:

a rotatable vessel having an axis of rotation;

a target block fixed to the vessel, wherein the target block defines a target shape;

a base plate having a fixed position relative to the vessel and having a radiused upper surface;

a slide plate having a radiused lower surface corresponding to and contacting the radiused upper surface, wherein the slide plate is configured to be alternately rotationally adjustable relative to the base plate and lockable relative to the base plate at a plurality of rotational positions;

a protrusion attached to the slide plate, wherein the protrusion is reciprocally moveable in a linear direction normal to the upper surface of the base plate, away from the slide plate, and toward the axis of rotation of the vessel;

wherein the protrusion has a shape that corresponds to the target shape such that the target block and the protrusion fit together in a locked state, and the protrusion is moveable into and out of engagement with the target block;

wherein, when the slide plate is in a locked slide plate position relative to the base plate, and the protrusion is extended into engagement with the target block and in the locked state with the target block, the vessel is in a first locked vessel position;

wherein, when the protrusion is retracted out of engagement with the target block, the vessel is free to rotate relative to the slide plate;

wherein movement of the protrusion into engagement with the target block when the slide plate is in the locked position will rotate the vessel to the first locked vessel position from a different rotational position.

14. The system of claim 13, wherein, when the protrusion is in the locked state with the target block and the slide plate is rotationally adjusted relative to the base plate, the vessel and slide plate rotate together.

15. The system of claim 14, wherein movement of the slide plate from the locked position to a different rotational position will rotate the vessel away from the first locked vessel position to a different locked vessel position rotationally relative to the slide plate.

* * * * *